United States Patent
Wichers et al.

(10) Patent No.: US 8,120,357 B2
(45) Date of Patent: Feb. 21, 2012

(54) METHOD AND SYSTEM FOR FLUID CHARACTERIZATION OF A RESERVOIR

(75) Inventors: Wicher Wichers, Westbeemster (NL); Chanh Cao Minh, Katy, TX (US); Bei Gao, Shanghai (CN); Peter Weinheber, Luanda (AO); Cosan Ayan, Istanbul (TR); Oliver C. Mullins, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 258 days.

(21) Appl. No.: 12/464,187

(22) Filed: May 12, 2009

(65) Prior Publication Data
US 2010/0127701 A1    May 27, 2010

Related U.S. Application Data

(60) Provisional application No. 61/057,736, filed on May 30, 2008.

(51) Int. Cl.
*G01V 3/00*    (2006.01)
(52) U.S. Cl. ........................................ 324/303
(58) Field of Classification Search ........... 324/300–322
See application file for complete search history.

(56) References Cited

U.S. PATENT DOCUMENTS

| | | | |
|---|---|---|---|
| 2,824,445 A * | 2/1958 | Reese | 73/790 |
| 5,789,669 A * | 8/1998 | Flaum | 73/152.51 |
| 6,346,813 B1 | 2/2002 | Kleinberg | |
| 6,765,380 B2 | 7/2004 | Freedman | |
| 6,808,028 B2 | 10/2004 | Woodburn | |
| 7,031,841 B2 * | 4/2006 | Zazovsky et al. | 702/12 |
| 7,277,796 B2 | 10/2007 | Kuchuk | |
| 7,558,716 B2 * | 7/2009 | Hammond | 703/10 |
| 7,762,325 B2 * | 7/2010 | Ellson et al. | 166/187 |
| 7,765,862 B2 * | 8/2010 | Flaum | 73/152.51 |
| 7,784,330 B2 * | 8/2010 | Angelescu et al. | 73/54.09 |
| 2009/0025983 A1 * | 1/2009 | Ellson et al. | 175/230 |

* cited by examiner

*Primary Examiner* — Dixomara Vargas

(57) ABSTRACT

A method for determining fluids in a formation. The method includes obtaining open hole measurements for a borehole in the formation; identifying points in the borehole from which to obtain pressure measurements using the open hole measurements; obtaining pressure measurements at the identified points in the borehole; applying an excess pressure technique to the pressure measurements to identify a plurality of pressure compartments in the borehole; characterizing fluid in each of the plurality of compartments; and developing a drilling plan based on characterization of fluids in each of the plurality of compartments.

12 Claims, 8 Drawing Sheets

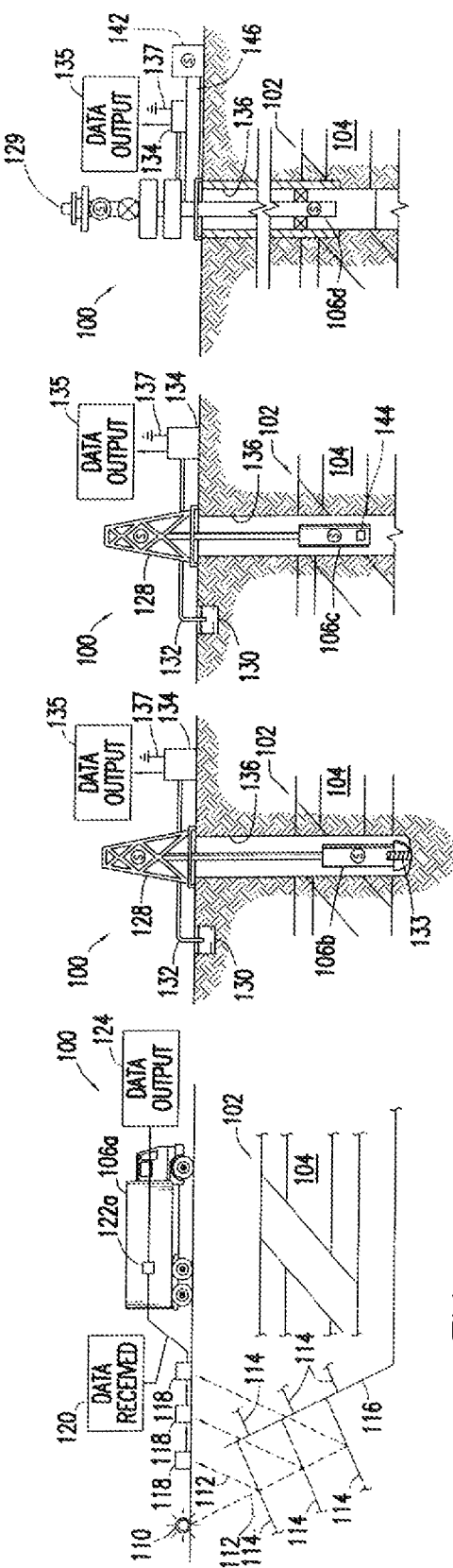
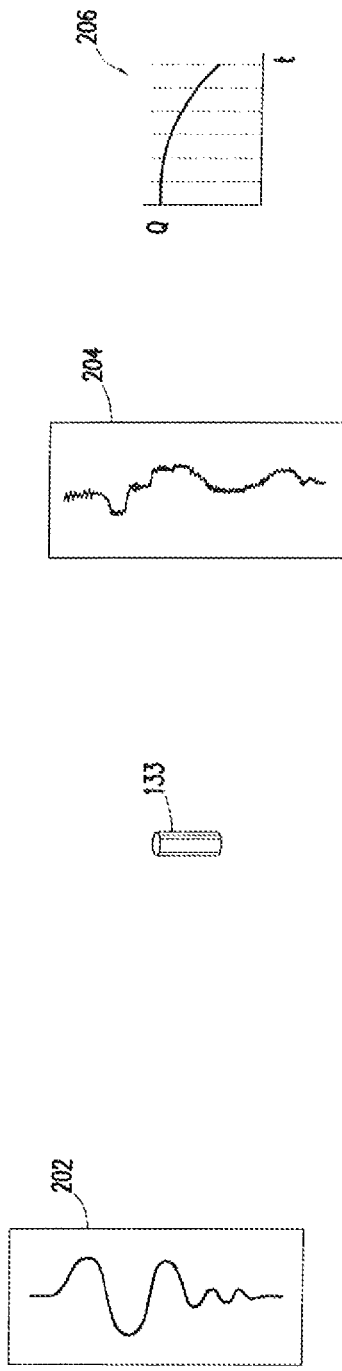

METHOD AND SYSTEM FOR FLUID CHARACTERIZATION OF A RESERVOIR

CROSS REFERENCE TO RELATED APPLICATIONS

This application claims priority under 35 U.S.C. §119(e) from Provisional Patent Application No. 61/057,736 filed May 30, 2008, entitled "Method and System for Fluid Characterization of Reservoir", which is hereby incorporated by reference in its entirety.

BACKGROUND

1. Field of the Invention

The invention relates to techniques for determining formation fluid properties. More particularly, the invention relates to determining the composition of fluid in a pressure compartment in order to develop a drilling plan for a reservoir.

2. Background of the Related Art

The oil and gas industry has traditionally classified reservoirs by structures subdivided into geological units or pressure compartments in order to characterize fluids in a formation. During the exploration cycle of the process, the resolution may be improved from seismic/aero magnetic surveys to wireline logs, and the pressure compartments may be further subdivided based on higher resolution log responses from gamma ray (GR), nuclear density, resistivity and nuclear magnetic resonance logs (NMR). The log responses are based on well known physics in the domains, and log/tool readings are affected by lithological changes and rock fluid content.

With the emergence of near infra red (NIR) analysis, there is now capability to physically measuring critical fluid properties of formation fluid which may be produced through a wireline formation tester (WFT) tool by using a pump. As a result, it has been determined that pressure compartments typically do not contain one type of fluid but instead, the fluid has considerable variation which shows either completely different fluids or a fluid compositional gradient in the compartments.

Despite the development and advancement of various methods for determining formation fluid properties based on acquiring formation fluid samples from inside the wellbore, there remains a need to provide techniques capable of determining the composition of fluids in pressure compartments and incorporating fluid characteristics in the geophysics and geology cycle.

SUMMARY

An embodiment of the invention relates to a method for determining fluids in a formation. The method includes obtaining open hole measurements for a borehole in the formation; identifying points in the borehole from which to obtain pressure measurements using the open hole measurements; obtaining pressure measurements at the identified points in the borehole; applying an excess pressure technique to the pressure measurements to identify a plurality of pressure compartments in the borehole; characterizing fluid in each of the plurality of compartments; and developing a drilling plan based on characterization of fluids in each of the plurality of compartments.

BRIEF DESCRIPTION OF DRAWINGS

FIGS. 1A-1D depict a schematic view of an oilfield having subterranean structures containing reservoirs therein, various oilfield operations being performed on the oilfield.

FIGS. 2A-2D depict graphical depictions of data collected by the tools of FIGS. 1A-1D, respectively.

DETAILED DESCRIPTION

Figure 3:
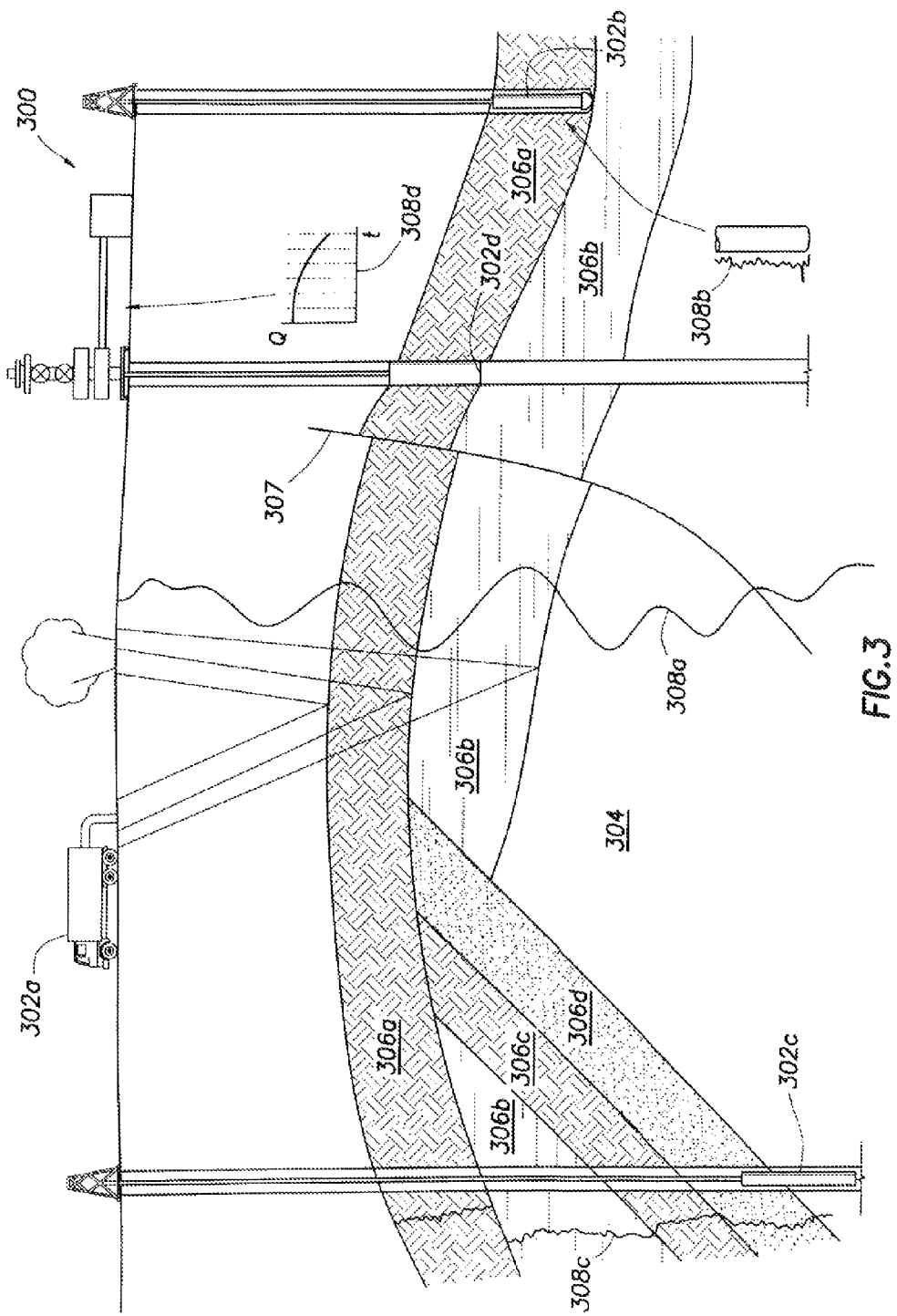
FIG. 3 depicts a schematic view, partially in cross-section of an oilfield having data acquisition tools.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The following detailed description and attached figures include the terms "FIG." and "Figure(s)" both of which refer to the attached figures. These terms are used interchangeably throughout the specification.

In general, embodiments of the invention relate to a method and system for characterizing fluid in a reservoir. More specifically, embodiments of the invention provide a method and system for using excess pressure and open hole measurements to characterize fluid in a reservoir.

The invention involves applications generated for the oil and gas industry. FIGS. 1A-1D depict an exemplary oilfield (100) with subterranean structures and geological structures therein. More specifically, FIGS. 1A-1D depict schematic views of an oilfield (100) having subterranean structures (102) containing a reservoir (104) therein and depicting various oilfield operations being performed on the oilfield. Various measurements of the subterranean formation are taken by different tools at the same location. These measurements may be used to generate information about the formation and/or the geological structures and/or fluids contained therein.

A reservoir (104) contains in situ (i.e., in place) fluids that may have vertical and lateral variations within a geological structure. The variations in fluids may be due to the presence of different fluids or gases within the geological structure, or having a fluid compositional gradient within the geological structure. A reservoir with compositional variations is referred to as a compositionally graded reservoir, or simply a graded reservoir. A graded reservoir may be a saturated reservoir (i.e., very close to the bubble point) and small changes in pressure can alter fluid composition and reservoir properties. The correct characterization of reservoir in situ fluids is therefore an important factor in determining the potential hydrocarbon production of a reservoir as well as the method for producing the reservoir.

For the purposes of this application, a reservoir is a subsurface body of rock having sufficient porosity and permeability to store and transmit fluids. Further, a formation is a body of rock that is sufficiently distinctive and continuous that it can be mapped.

FIG. 1A depicts a survey operation being performed by a seismic truck (106a) to measure properties of the subterranean formation. The survey operation is a seismic survey operation for producing sound vibrations. In FIG. 1A, an acoustic source (110) produces sound vibrations (112) that reflect off a plurality of horizons (114) in an earth formation (116). The sound vibration(s) (112) is (are) received in by sensors, such as geophone-receivers (118), situated on the earth's surface, and the geophones (118) produce electrical output signals, referred to as data received (120) in FIG. 1.

The received sound vibration(s) (112) are representative of different parameters (such as amplitude and/or frequency). The data received (120) is provided as input data to a computer (122a) of the seismic recording truck (106a), and responsive to the input data, the recording truck computer (122a) generates a seismic data output record (124). The seismic data may be further processed, as desired, for example by data reduction.

FIG. 1B depicts a drilling operation being performed by a drilling tool (106b) suspended by a rig (128) and advanced into the subterranean formation (102) to form a borehole (136), also referred to as a wellbore. A borehole, when first drilled, is uncased. Uncased portions of a borehole are referred to as openhole. Typically, a borehole is completed by installing casing and other materials in the borehole. The casing may be installed to keep the borehole from caving in, to strengthen a formation and/or to isolate a formation or fluids within a formation. A mud pit (130) is used to draw drilling mud into the drilling tool via a flow line (132) for circulating drilling mud through the drilling tool and back to the surface. The drilling tool is advanced into the formation to reach the reservoir (104). The drilling tool is preferably adapted for measuring downhole properties. The logging while drilling tool may also be adapted for taking a core sample (133) as shown, or removed so that a core sample (133) may be taken using another tool.

A surface unit (134) is used to communicate with the drilling tool and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield. The surface unit (134) collects data output (135) generated during the drilling operation. Computer facilities, such as those of the surface unit, may be positioned at various locations about the oilfield and/or at remote locations.

Sensors (S), such as gauges, may be positioned throughout the reservoir, rig, oilfield equipment (such as the downhole tool) or other portions of the oilfield for gathering information about various parameters, such as surface parameters, openhole parameters, downhole parameters and/or operating conditions. These sensors (S) preferably measure oilfield parameters, such as weight on bit, torque on bit, pressures, temperatures, flow rates, compositions, measured depth, azimuth, inclination and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other boreholes.

Data outputs from the various sensors (S) positioned about the oilfield may be processed for use. The data may be may be historical data, real time data or combinations thereof The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, and/or reservoir engineering simulations. The reservoir, borehole, surface, and/or process data may be used to perform reservoir, borehole, or other production simulations. The data outputs (135) from the oilfield operation may be generated directly from the sensors (S), or after some preprocessing or modeling. These data outputs (135) may act as inputs for further analysis.

The data may be collected and stored at the surface unit (134). One or more surface units may be located at the oilfield, or linked remotely thereto. The surface unit (134) may be a single unit, or a complex network of units used to perform the necessary data management functions throughout the oilfield. The surface unit (134) may be a manual or automatic system. The surface unit (134) may be operated and/or adjusted by a user.

The surface unit (134) may be provided with a transceiver (137) to allow communications between the surface unit (134) and various portions of the oilfield and/or other locations. The surface unit (134) may also be provided with or functionally linked to a controller for actuating mechanisms at the oilfield. The surface unit (134) may then send command signals to the oilfield in response to data received. The surface unit (134) may receive commands via the transceiver or may itself execute commands to the controller. A processor may be provided to analyze the data (locally or remotely) and make the decisions to actuate the controller. In this manner, the oilfield may be selectively adjusted based on the data collected. These adjustments may be made automatically based on computer protocol, or manually by an operator. In some cases, well plans and/or well placement may be adjusted to select optimum operating conditions, or to avoid problems. For example, the processor may analyze data outputs (135), which may include a seismic data output record (124). The analysis of the seismic data output record (124) may determine locations to perform wireline operations to further characterize seismic data in a particular location.

FIG. 1C depicts a wireline operation being performed by a wireline tool (106c) suspended by the rig (128) and into the borehole (136) of FIG. 1B. The wireline tool (106c) is preferably adapted for deployment into a borehole (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (144) that provides seismic signals to the surrounding subterranean formations (102). The wireline tool (106c) may also be used to collect samples for fluid characterization through analysis of variations in fluid coloration or calculation of oil-to-gas ratios.

The wireline tool (106c) may be operatively linked to, for example, the geophones (118) stored in the computer (122a) of the seismic recording truck (106a) of FIG. 1A. The wireline tool (106c) may also provide data to the surface unit (134). As shown, data output (135) is generated by the wireline tool (106c) and collected at the surface. The wireline tool (106c) may be positioned at various depths in the borehole (136) to provide a survey of the subterranean formation (102).

FIG. 1D depicts a production operation being performed by a production tool (106d) deployed from a production unit or Christmas tree (129) and into the completed borehole (136) of FIG. 1C for drawing fluid from the downhole reservoirs into the surface facilities (142). Fluid flows from reservoir (104) through perforations in the casing (not shown) and into the production tool (106d) in the borehole (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

During the production process, data output (135) may be collected from various sensors (S) and passed to the surface unit (134) and/or processing facilities. This data may be, for example, reservoir data, openhole data, borehole data, drawdown pressure, flowing bottom hole pressure, surface data, and/or process data. Drawdown pressure (also referred to as drawdown) is the difference between average reservoir pressure and flowing bottom hole pressure.

While FIGS. 1A-1D depict monitoring tools used to measure properties of an oilfield, it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration of FIGS. 1A-1D is not intended to limit the scope of the invention. Part, or all, of the oilfield may be on land and/or sea. Also, while a single oilfield measured at a single location is depicted, the invention may be utilized with any combination of one or more oilfields, one or more processing facilities and one or more wellsites.

FIGS. 2A-2D are graphical depictions of data collected by the tools of FIGS. 1A-1D, respectively. FIG. 2A depicts a seismic trace (202) of the subterranean formation (102) of FIG. 1A taken by survey tool (106a). The seismic trace (202) measures the two-way response over a period of time. FIG. 2B depicts a core sample (133) taken by the logging tool (106b). A core test typically provides a graph of the porosity, permeability, or other physical property of the core sample (133) over the length of the core. FIG. 2C depicts a well log (204) of the subterranean formation (102) of FIG. 1C taken by the wireline tool (106c). The wireline log typically provides a measurement of resistivity, density or other physical properties of the formation at various depths. FIG. 2D depicts a production decline curve (206) of fluid flowing through the subterranean formation (102) of FIG. 1D taken by the production tool (106d). The production decline curve (206) typically provides the production rate (Q) as a function of time (t).

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the borehole. As the fluid flows through the borehole, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may need adjustment.

FIG. 3 is a schematic view, partially in cross section of an oilfield (300) having data acquisition tools (302a), (302b), (302c), and (302d) positioned at various locations along the oilfield for collecting data of the subterranean formation (304). The data acquisition tools (302a)-(302d) may be the same as data acquisition tools (106a)-(106d) of FIG. 1, respectively. As shown, the data acquisition tools (302a)-(302d) generate data plots or measurements (308a)-(308d), respectively.

Data plots (308a)-(308c) are examples of static data plots that may be generated by the data acquisition tools (302a)-(302d), respectively. Static data plot (308a) is a seismic two-way response time and may be the same as the seismic trace (202) of FIG. 2A. Static plot (308b) is core sample data measured from a core sample of the formation (304), similar to core sample (133) of FIG. 2B. Static data plot (308c) is a logging trace, similar to the well log (204) of FIG. 2C. Data plot (308d) is a dynamic data plot of the fluid flow rate over time, similar to the graph (206) of FIG. 2D. Other data may also be collected, such as historical data, user inputs, economic information other measurement data and other parameters of interest.

The subterranean formation (304) has a plurality of geological structures (306a)-(306e). In one or more embodiments of the invention, the subterranean formation is a volcanic reservoir formation. As shown, the formation (304) has a first formation layer (306a), a second formation layer (306b), a third formation layer (306c), and a fourth formation layer (306d). In one or more embodiments of the invention, the third formation layer (306c) is a shale layer and the fourth formation layer (306d) is a sand layer. Those skilled in the art, having the benefit of this detailed description, will appreciate the subterranean formation (304) may have any number of layers. A fault line (307) extends through the formation. The static data acquisition tools are preferably adapted to measure the formation (304) and detect the characteristics of the geological structures of the formation (304).

While a specific subterranean formation with specific geological structures is depicted, it will be appreciated that the formation may contain a variety of geological structures. Fluid may also be in various portions of the formation. Each of the measurement devices may be used to measure properties of the formation and/or its underlying structures. While each acquisition tool (e.g., (302a)-(302d)) is shown as being in specific locations along the formation, it will be appreciated that one or more types of measurement may be taken at one or more location across one or more oilfields or other locations for comparison and/or analysis. The data collected from various sources may be processed by the processing unit (432) and stored in the data repository (434) as multiple data sets ready to be retrieved for evaluation. The data sets may include a 2D data set, a 3D data set (i.e., 3D volume data set), or other formats known within the art. Typically, seismic data displayed in the static data plot (308a) from the data acquisition tool (302a) is used by a geophysicist to determine characteristics of the subterranean formation (304). Core data shown in static plot (308b) and/or log data from the well log (308c) are typically used by a geologist to determine various characteristics of the geological structures of the subterranean formation (304). Production data from the production graph (308d) is typically used by the reservoir engineer to determine fluid flow reservoir characteristics. For example, a production graph (308d) may be a graph showing the well inflow performance relationship, where the production rates at various drawdown pressures are plotted to construct a curve. This curve would reflect the ability of a reservoir to deliver fluid to a borehole. Another example of a production graph (308d) would be tubing performance, plotting the surface production rate against flowing bottomhole pressure. The operating point would therefore be the point at which the well inflow performance curve intersects with the curve reflecting tubing performance. Further, one or more data sets may be visualized simultaneously to provide a broader view of the features of the subterranean formations.

Figure 4:
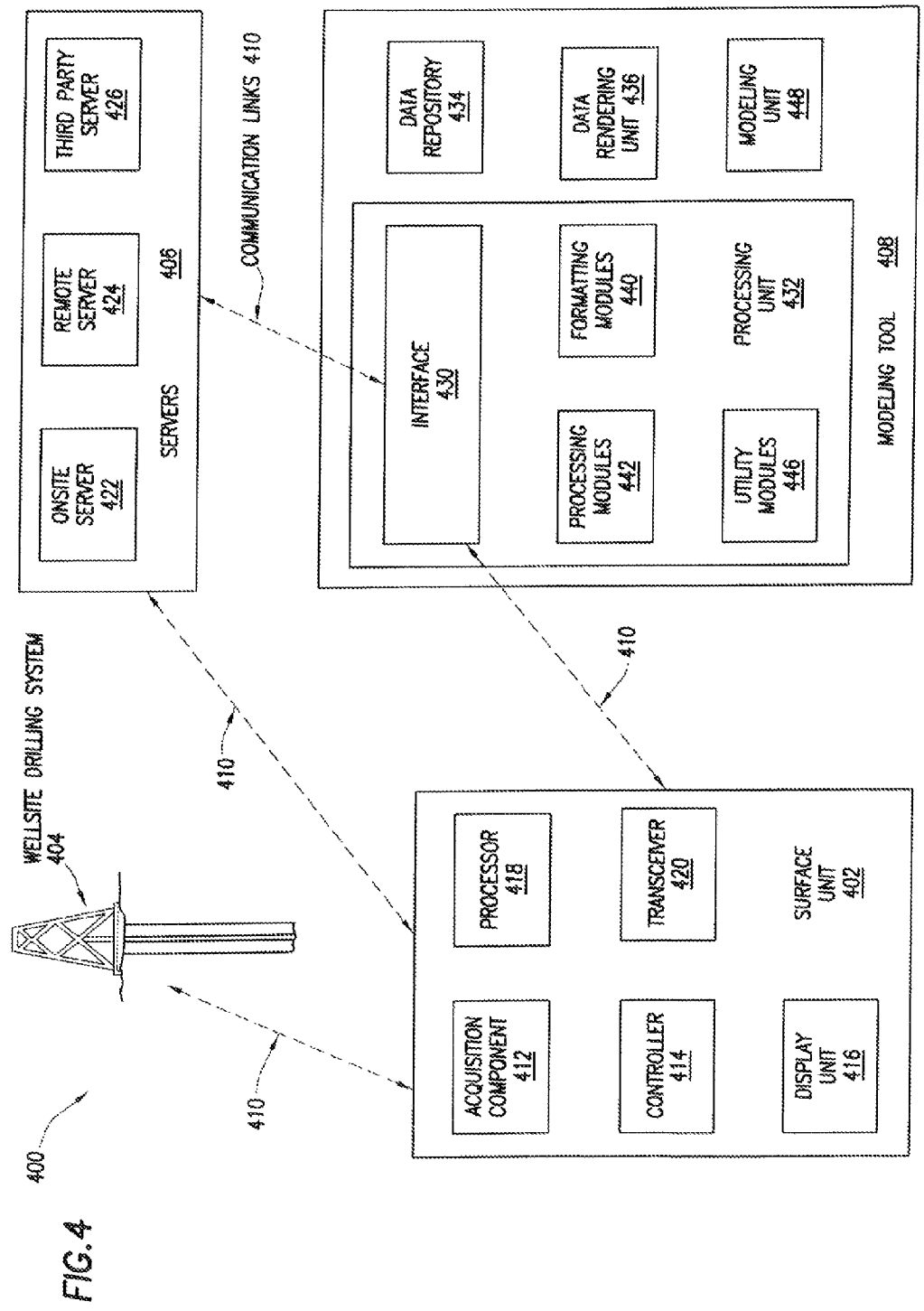
FIG. 4 depicts a schematic diagram of a system for performing oilfield operations of an oilfield.

FIG. 4 is a schematic view of a system (400) for performing oilfield operations of an oilfield. As shown, the system (400) includes a surface unit (402) operatively connected to a wellsite drilling system (404), servers (406) operatively linked to the surface unit (402), and a modeling tool (408) operatively linked to the servers (406). As shown, communication links (410) are provided between the wellsite drilling system (404), surface unit (402), servers (406), and modeling tool (408). A variety of links may be provided to facilitate the flow of data through the system. For example, the communication links (410) may provide for continuous, intermittent, one-way, two-way and/or selective communication throughout the system (400). The communication links (410) may be of any type, such as wired, wireless, etc.

The surface unit (402) is preferably provided with an acquisition component (412), a controller (414), a display unit (416), a processor (418) and a transceiver (420). The acquisition component (412) collects and/or stores data of the oilfield. This data may be data measured by the sensors (S) of the wellsite as described with respect to FIGS. 1A-1D. This data may also be data received from other sources.

The controller (414) is enabled to enact commands at the oilfield. The controller (414) may be provided with actuation means that can perform drilling operations, such as steering, advancing, or otherwise taking action at the wellsite. Commands may be generated based on logic of the processor (418), or by commands received from other sources. The processor (418) is preferably provided with features for manipulating and analyzing the data. The processor (418) may be provided with additional functionality to perform oilfield operations.

A display unit (416) may be provided at the wellsite and/or remote locations for viewing oilfield data (not shown). The oilfield data read by a display unit (416) may be raw data, processed data and/or data outputs generated from various data. The display unit (416) is preferably adapted to provide flexible views of the data, so that the screens depicted may be customized as desired. A user may plan, adjust, and/or otherwise perform oilfield operations (e.g., determine the desired course of action during drilling) based on reviewing the displayed oilfield data. The oilfield operations may be selectively adjusted in response to viewing the data on the display unit (416). The display unit (416) may include a two-dimensional (2D) display or a three-dimensional (3D) display for viewing oilfield data or various aspects of the oilfield operations.

The transceiver (420) provides a means for providing data access to and/or from other sources. The transceiver (420) also provides a means for communicating with other components, such as the servers (406), the wellsite drilling system (404), surface unit (402), and/or the modeling tool (408).

The servers (406) may be used to transfer data from one or more wellsites to the modeling tool (408). As shown, the servers (406) include an onsite server (422), a remote server (424), and a third party server (426). The onsite server (422) may be positioned at the wellsite and/or other locations for distributing data from the surface unit. The remote server (424) is positioned at a location away from the oilfield and provides data from remote sources. The third-party server (426) may be onsite or remote, but is operated by a third-party, such as a client.

The servers (406) are preferably capable of transferring drilling data, such as logs, drilling events, trajectory, and/or other oilfield data, such as seismic data, historical data, economics data, or other data that may be of use during analysis. The type of server is not intended to limit the invention. Preferably the system is adapted to function with any type of server that may be employed.

The servers (406) communicate with the modeling tool (408) as indicated by the communication links (410). As indicated by the multiple arrows, the servers (406) may have separate communication links (410) with the modeling tool (408). One or more of the servers (406) may be combined or linked to provide a combined communication link (410).

The servers (406) collect a wide variety of data. The data may be collected from a variety of channels that provide a certain type of data, such as well logs. The data from the servers is passed to the modeling tool (408) for processing. The servers (406) may also be used to store and/or transfer data.

The modeling tool (408) is operatively linked to the surface unit (402) for receiving data therefrom. In some cases, the modeling tool (408) and/or server(s) (406) may be positioned at the wellsite. The modeling tool (408) and/or server(s) (406) may also be positioned at various locations. The modeling tool (408) may be operatively linked to the surface unit via the server(s) (406). The modeling tool (408) may also be included in or located near the surface unit (402).

The modeling tool (408) includes an interface (430), a processing unit (432), a modeling unit (448), a data repository (434) and a data rendering unit (436). The interface (430) communicates with other components, such as the servers (406). The interface (430) may also permit communication with other oilfield or non-oilfield sources. The interface (430) receives the data and maps the data for processing. Data from servers (406) typically streams along predefined channels, which may be selected by the interface (430).

As depicted in FIG. 4, the interface (430) selects the data channel of the server(s) (406) and receives the data. The interface (430) also maps the data channels to data from the wellsite. The data may then be passed to the processing modules (442) of the modeling tool (408). Preferably, the data is immediately incorporated into the modeling tool (408) for real-time sessions or modeling. The interface (430) creates data requests (for example surveys, logs and/or other volume data sets), displays the user interface, and handles connection state events. The interface (430) also instantiates the data into a data object for processing.

The processing unit (432) includes formatting modules (440), processing modules (442), and utility modules (446). These modules are designed to manipulate the oilfield data for real-time analysis.

The formatting modules (440) are used to conform the data to a desired format for processing. Incoming data may need to be formatted, translated, converted or otherwise manipulated for use. The formatting modules (440) are configured to enable the data from a variety of sources to be formatted and used so that the data processes and displays in real time.

The utility modules (446) provide support functions to the drilling system. The utility modules (446) include the logging component (not shown) and the user interface (UI) manager component (not shown). The logging component provides a common call for all logging data. This module allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The UI manager may also be used to handle events relating to these user input screens.

The processing module (442) is used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations. The data is processed by the processing module (442) into multiple volume data sets for storage and retrieval.

The data repository (434) may store the data for the modeling unit (448). The data is preferably stored in a format available for use in real-time (e.g., information is updated at approximately the same rate the information is received). The data is generally passed to the data repository (434) from the processing modules (442). The data can be persisted in the file system (e.g., as an extensible markup language (XML) file) or in a database. The system determines which storage is the most appropriate to use for a given piece of data and stores the data in a manner to enable automatic flow of the data through the rest of the system in a seamless and integrated fashion. The system also facilitates manual and automated workflows (such as Modeling, Geological & Geophysical workflows) based upon the persisted data.

The data rendering unit (436) performs a rendering algorithm calculation to provide one or more displays for visualizing the data. The displays may be viewed by a user at the display unit (416). The data rendering unit (436) may contain a 2D canvas, a 3D canvas, a well section canvas or other canvases as desired. The data rendering unit (436) may selectively provide displays composed of any combination of one or more canvases. The canvases may or may not be synchronized with each other during display. The data rendering unit (436) is preferably provided with mechanisms for actuating various canvases or other functions in the system. Further, the data rendering unit (436) may selectively provide displays composed of any combination of one or more volume data sets. The volume data sets typically contain exploration and production data, such as that shown in FIGS. 2A-2D.

While specific components are depicted and/or described for use in the units and/or modules of the modeling tool (408), it will be appreciated that a variety of components with various functions may be used to provide the formatting, processing, utility and coordination functions necessary to provide processing in the modeling tool (408). The components may have combined functionalities and may be implemented as software, hardware, firmware, or combinations thereof.

Further, components (e.g., the processing modules (442) and the data rendering unit (436)) of the modeling tool (408) may be located in an onsite server (422) or in distributed locations where remote server (424) and/or third party server (426) may be involved. The onsite server (422) may be located within the surface unit (402).

The system (400) for performing oilfield operations, described above, is operated to measure and exploit oilfield data. Measurements of oilfield data may be used to generate information about the formation and/or the geological structures and/or fluids contained therein. These measurements are used with the system (400) in order to plan, adjust, and/or otherwise perform oilfield operations to recover fluids from a reservoir. However, as discussed previously, the reservoir may contain fluids with vertical and lateral variations due to the presence of different fluids within the formation and/or geological structure, or due to having a fluid compositional gradient within the formation and/or geological structure. One or more embodiments of a method to obtain the in situ fluid characterization are discussed below in FIG. 5.

Figure 5:
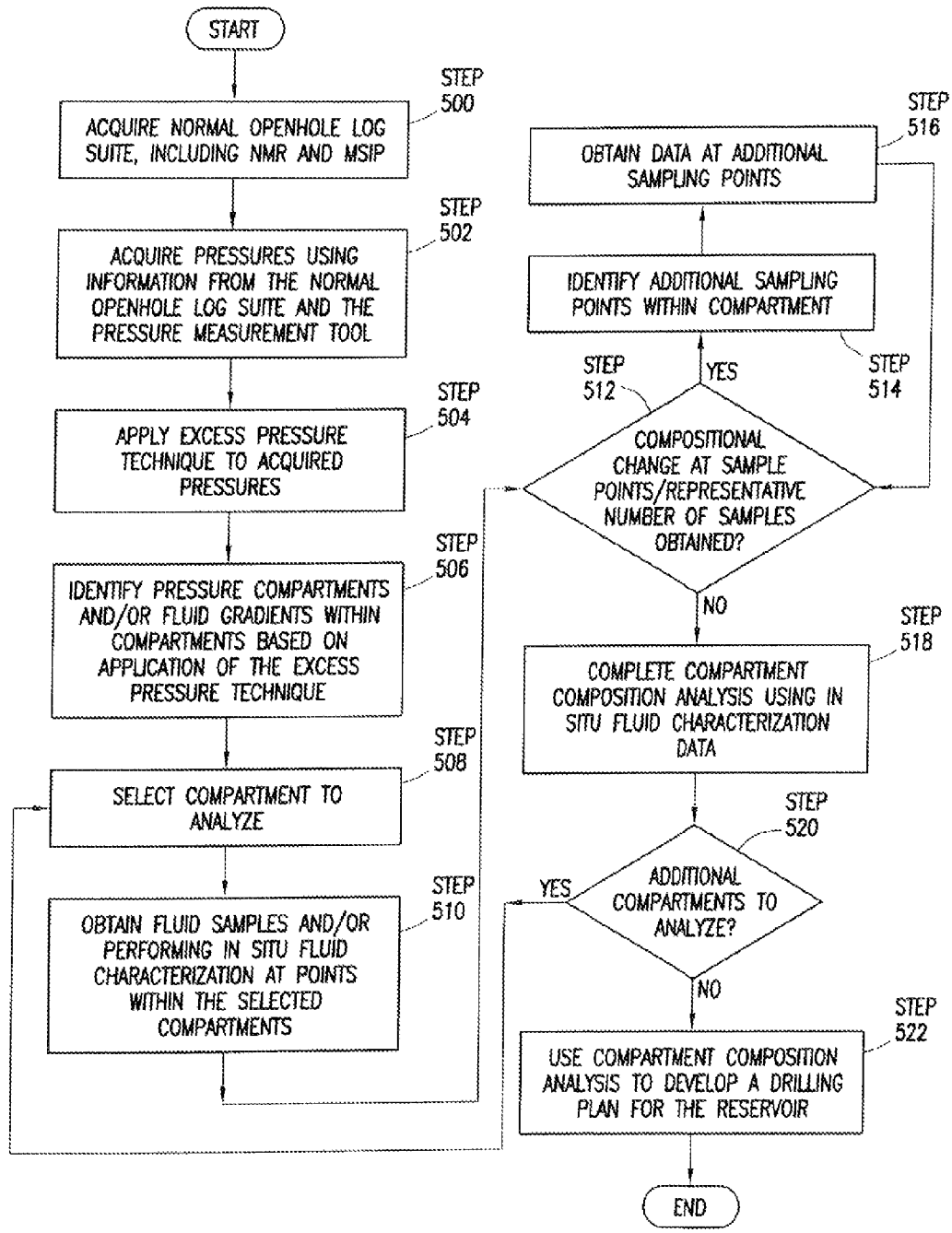
FIG. 5 depicts a flowchart in accordance with one or more embodiments of the invention.

FIG. 5 shows a flowchart in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

Turning to FIG. 5, in step (500), the normal openhole log suite measurements are acquired. In one or more embodiments of the invention, the normal openhole log suite measurements include, but are not limited to, nuclear magnetic resonance (NMR) and Modular Sonic Imaging Platform (MSIP) measurements. NMR techniques are used to measure the nuclear magnetic properties of formation hydrogen. These NMR measurements are processed to provide permeability data (including, for example, static or inferred permeability, porosity, viscosity, and gas-to-oil ratio, etc.) and an indication of hydrocarbon type (e.g., C1, C2, C3,etc.). Vertical variations in permeability data and hydrocarbon type and properties indicate fluid gradients. It is understood that non-hydrocarbon gases such as $CO_2$, $H_2S$ and $N_2$ may be present and used to indicate fluid gradients. Radial variations in porosity, bound fluid and permeability indicate wash-outs, formation damage or heavy viscous oil to be avoided during fluid sampling (discussed in step 510 below) MSIP obtains sonic measurements by generating headwaves (greater than 1000 Hz) that travel along an interface and radiate energy back into the fluid-filled borehole. The radiated energy is measured by the MSIP as a mobility measurement. Trends in mobility or absence of a trend are interpreted to provide detection of damaged borehole sections. Identifying the damaged borehole sections allows these sections to be avoided during fluid sampling (discussed in Step 510 below), as data from such section is non-representative of the borehole. Sampling at these damaged borehole sections may also cause excessive drawdown when taking additional samples. Normal openhole log suite measurements may also be acquired using a Combinable Magnetic Resonance Tool (CMRT). CMRT is a wireline tool that provides a continuous interpretation of reservoir permeability. Tools and techniques for acquiring normal openhole log suite measurements are not limited to those discussed above; accordingly, normal openhole log suite measurements may be obtained using wireline tools or non-wireline tools other than those listed above. The normal openhole log suite measurements are used as input to the pressure measurement tool.

In step (502), in one or more embodiments of the invention, pressures are acquired using the normal openhole log suite and the pressure measurement tool. In one embodiment of the invention, pressure measurements may be taken using a Modular Formation Dynamics Tester (MDT), another wireline tool for performing downhole tests. Locations of the pressure measurements are determined using the normal openhole log suite measurements taken in step (500). For example, the NMR and CMRT measurements of permeability, hydrocarbon type and other data provide information on the depth and frequency with which to take pressure measurements in the borehole. Sections of the borehole may not be measured, based on the MSIP data, to avoid obtaining non-representative pressure measurements and to avoid potentially excessive drawdown. In one embodiment of the invention, the pressure measurements are taken as the MDT is lowered and raised via a wire into the borehole. MDT measurements may include fluid optical analysis as well as pressure measurements. Tools for acquiring pressures are not limited to the MDT; accordingly, pressures may be acquired using tools other than MDT.

In step (504), the excess pressure technique is applied to the acquired pressures from step (502). The excess pressure technique calculates excess pressure as the pressure remaining after subtracting the weight of the fluid from the measured pressure. The excess pressure technique may be applied to wireline pressure data to remove effects of weight and emphasize small pressure differences caused by density variations and pressure barriers within the borehole. In one or more embodiments of the invention, the excess pressures from step (502) are plotted on a pressure versus depth plot (PD-plot). The PD-plot may be used to identify trends or absence of excess pressure trends on the PD-plot. The excess pressure trends (or absence thereof) may be used to identify the presence of pressure compartments in the borehole.

In step (506), pressure compartments and/or fluid gradients within pressure compartments are identified based on the results of applying the excess pressure technique to the pressure data. Once pressure compartments are identified using the excess pressure technique, the location of the pressure compartments (i.e., the depth over which the pressure compartment exists) are verified using permeability data (or other similar data from the normal openhole log suite).

At this stage, the fluid within the individual compartments is analyzed. Specifically, steps (508-520) are performed on each pressure compartment. In step (508), a pressure compartment to analyze is selected.

In step (510), fluid samples and/or performing in situ fluid characterization points are obtained at points within the selected compartment. In one embodiment of the invention, the points/locations at which fluid samples and/or in situ fluid characterization are performed are selected based on the excess pressure analysis. In one embodiment of the invention, if the excess pressure analysis reveals that there is no change in excess pressure across a pressure compartment, then two points are selected within the pressure compartment. Specifically, the two points are a point near the top of the pressure compartment and a point near the bottom of the pressure compartment.

In one embodiment of the invention, if the excess pressure analysis reveals that there is a change in excess pressure across a pressure compartment (e.g., an excess pressure trend is present), then at least three points are selected within the pressure compartment. Specifically, the three points are a point near the top of the pressure compartment, a point near the middle of the pressure compartment, and a point near the bottom of the pressure compartment. Those skilled in the art will appreciate that top, middle and bottom are relative terms and reference to various relative depths within a given pressure compartment.

In one embodiment of the invention, the fluid samples are collected from the borehole at the specified locations and measured to obtain fluid properties (such as density, hydrocarbon analysis, and oil-to-gas ratio). In one embodiment of the invention, in situ fluid characterization at a given location may correspond to using wireline tools such as MDT to obtain fluid properties at the location. For example, a wireline tool may use a near-infrared optical absorption spectrometer to measure composition of the in situ fluid.

In step (512), a determination is made about whether the fluid properties at the selected locations are uniform (or substantially uniform). If the fluid properties are uniform (or substantially uniform), then there are no compositional changes (or relatively little variance) within the sampled fluids and the process proceeds to step 518. If the fluid properties are not uniform (or substantially non-uniform), then there are compositional changes of the sampled/analyzed fluids and the process proceeds to step 514.

In step (514), additional sampling points within the selected compartment are identified. If the samples or in situ fluid characterization obtained in step (510) indicate compositional change, one or more additional sampling points are identified at a location between the upper and lower measurements flanking the area of compositional change. In step (516), data is obtained at the additional sampling points using the methods described in step (510). The method then proceeds to step (512).

Upon returning to step (512), a determination is made about whether a representative number of fluid samples from the selected compartment have been obtained. In one embodiment of the invention, the number of fluid samples is deemed to be representative if there are sufficient samples of accurately characterize the fluid within the pressure compartment. Those skilled in the art will appreciate that depending on the implementation, the level of accuracy for fluid characterization may vary and, as such, the number of samples required to achieve the required accuracy may vary. Those skilled in the art will appreciate that if in situ fluid characterization is used to characterize the fluid, then sample points correspond to locations in the pressure compartment at which to perform additional fluid characterization. The process proceeds to step (514) if additional sample points are required; otherwise the process proceeds to step (518).

Optionally in step (518), if in situ analysis has not been performed and is necessary to complete the fluid characterization for the compartment, then in situ fluid characterization is performed for the fluid in the compartment at one or more locations. The data collected from the fluid samples and/or in situ fluid characterization may then be used to fully characterize the fluid composition of the pressure compartment. In step (520), a determination is made about whether there are additional pressure compartments to analyze. If there are additional pressure compartments to analyze, the process proceeds to step (508); otherwise the process proceeds to step (522).

In step (522), the pressure compartment composition analysis is used to develop additional confidence in well inflow performance and/or to develop a drilling plan for the reservoir. For example, the pressure compartment composition analysis may indicate areas of fluid variability within a pressure compartment or across pressure compartments. Such information may indicate that indicate that a well drilled in this location may not be profitable as the resulting produced hydrocarbons may include an excess amount of gas. Alternatively, the pressure compartment composition analysis may identify a viable production zone within the reservoir which was previously unknown. Additional information provided by the pressure compartment composition analysis may provide greater confidence in well inflow performance by adding detail of the ability of a reservoir to deliver fluid to a borehole. In one or more embodiment of the invention, a drilling plan is analogous to defining a well's inflow performance.

The following is an example of one or more embodiments of the invention. The example is not intended to limit the scope of the application. Turning to the example, the example is directed to a borehole that is initially analyzed using CMRT and MDT. The MDT uses a compositional fluid analyzer (CFA) to measure carbon strings (e.g., C1, C2-5, and C6+ content), apparent fluid density, fluorescence and $CO_2$ content. The data collected by the MDT identifies some of the in situ fluids or fluid properties. The MSIP is also used to measure fluid mobility within the formation and detect damaged borehole sections. The data from the above measurements is combined in a saturation water for production management log (SWPM) to characterize the formation. The combined data and SWPM determines the pressure measurement strategy for the borehole (i.e., at which locations to obtain pressure measurements).

A wireline tool, such as MDT, may be used to correlate and take pressures at the specified locations and frequency throughout the borehole. Excess pressures are calculated by subtracting the weight of the fluid from the pressure measurements.

Figure 7:
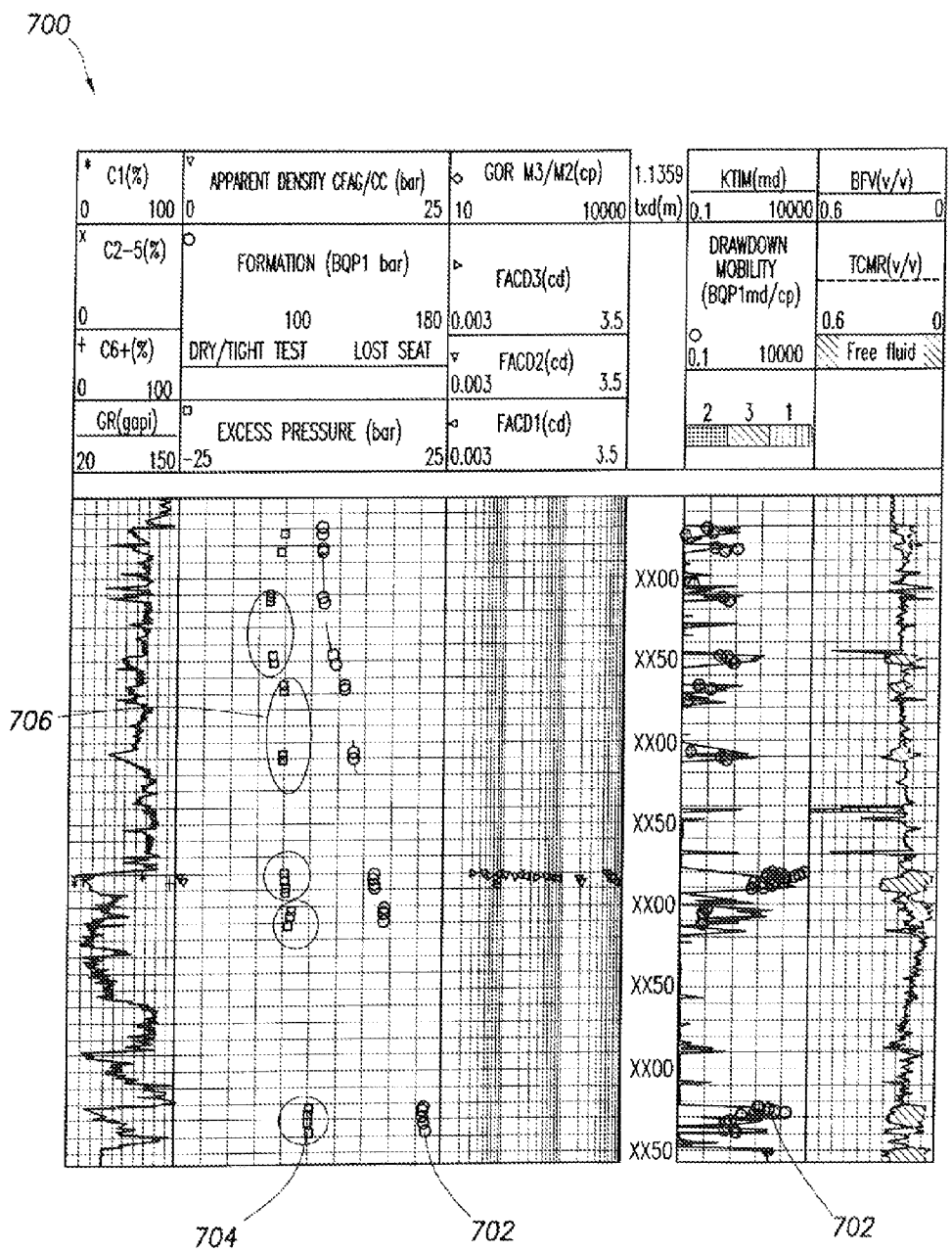
FIG. 7 depicts a well log including excess pressures and mobility vs. depth information in accordance with one or more embodiments of the invention.

The excess pressures are plotted on the well log depicted in FIG. 7. In FIG. 7, a well log (700) including excess pressures and mobility vs. depth information is shown. The circular data points (702) on the well log are the pressure measurements and the square data points (704) on the well log are the excess pressures. Pressure compartments (706) are identified by looking for compositional gradients indicated by changes in drawdown mobility or excess pressures, changes in density, hydrocarbon content, and gas-to-oil ratio. The pressure compartments (706) are depicted on the well log in FIG. 7 with circles (which may be depicted in red) enclosing groups of excess pressures. The compartments are then enlarged by graphing smaller sections of the data on individual well log. The enlargement of the data in depth xx20 to xx40 is depicted in FIG. 8.

Figure 8:
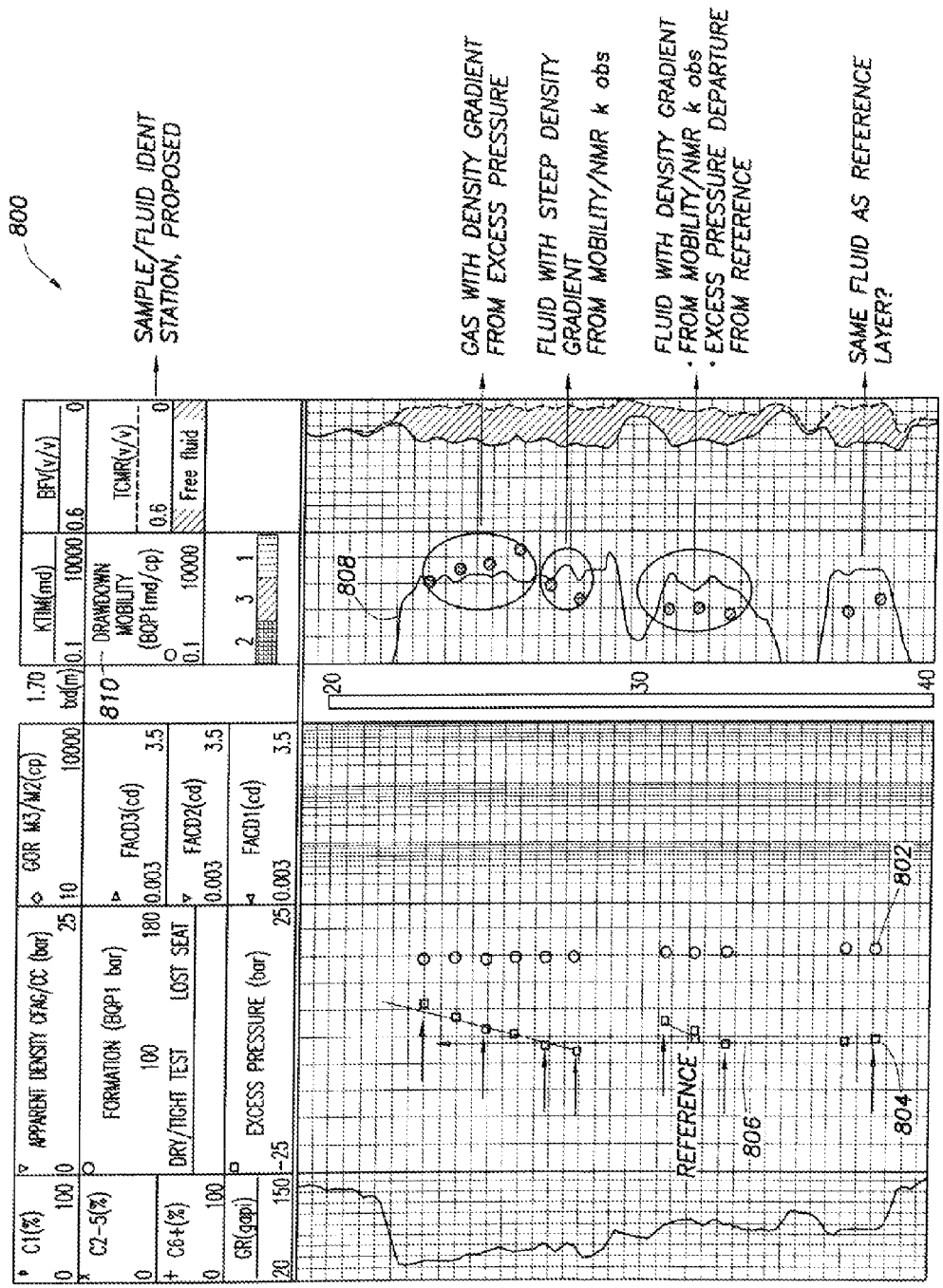
FIG. 8 depicts the well log with additional detail of data for depths xx20 to xx40 in accordance with one or more embodiments of the invention.

FIG. 8 depicts a well log (800) showing additional detail of data for depths xx20 to xx40. Again, the circular data points (802) on the well log are the pressure measurements and the square data points (804) on the well log are the excess pressures. To select additional fluid samples and/or in situ fluid characterization points from within each compartment, an analysis of the well log and excess pressures is performed. To analyze the excess pressures, a reference pressure is chosen on the well log based on a reference area of the borehole (here, the lowest excess pressures) and excess pressures that exceed the reference pressure are identified. In FIG. 8, the reference pressure (806) is indicated by the vertical line labeled "Reference." The excess pressures are grouped into three areas, each indicating a different wellbore rock type. The drawdown mobility is plotted on a logarithmic scale on the well log and provides additional data to analyze the excess pressures.

For example, the line (808) (which may be shown in red) under drawdown mobility (810) is the permeability measurements and the circular data points (812) under drawdown mobility are the mobility measurements. At xx25, the mobilities are higher than the permeability, indicating potential gas in that compartment. Between xx25 and xx30, the change in mobility indicates a steep density gradient, indicating potential variations in the in situ fluids, along with the corresponding gradients in the excess pressures. A similar change in mobility is seen for the data points between xx35 and xx30. Anomalies in any of these trends could lead to further investigation of potential borehole damage, for example, using the MSIP. The bottom two data points between xx40 and xx35 have excess pressures very close to the reference, indicating that the fluid at that point is likely the same composition as the reference fluid. The arrows pointing to the excess pressures indicate additional sampling points to obtain fluid samples and/or obtain in situ fluid characterization.

Figure 9:
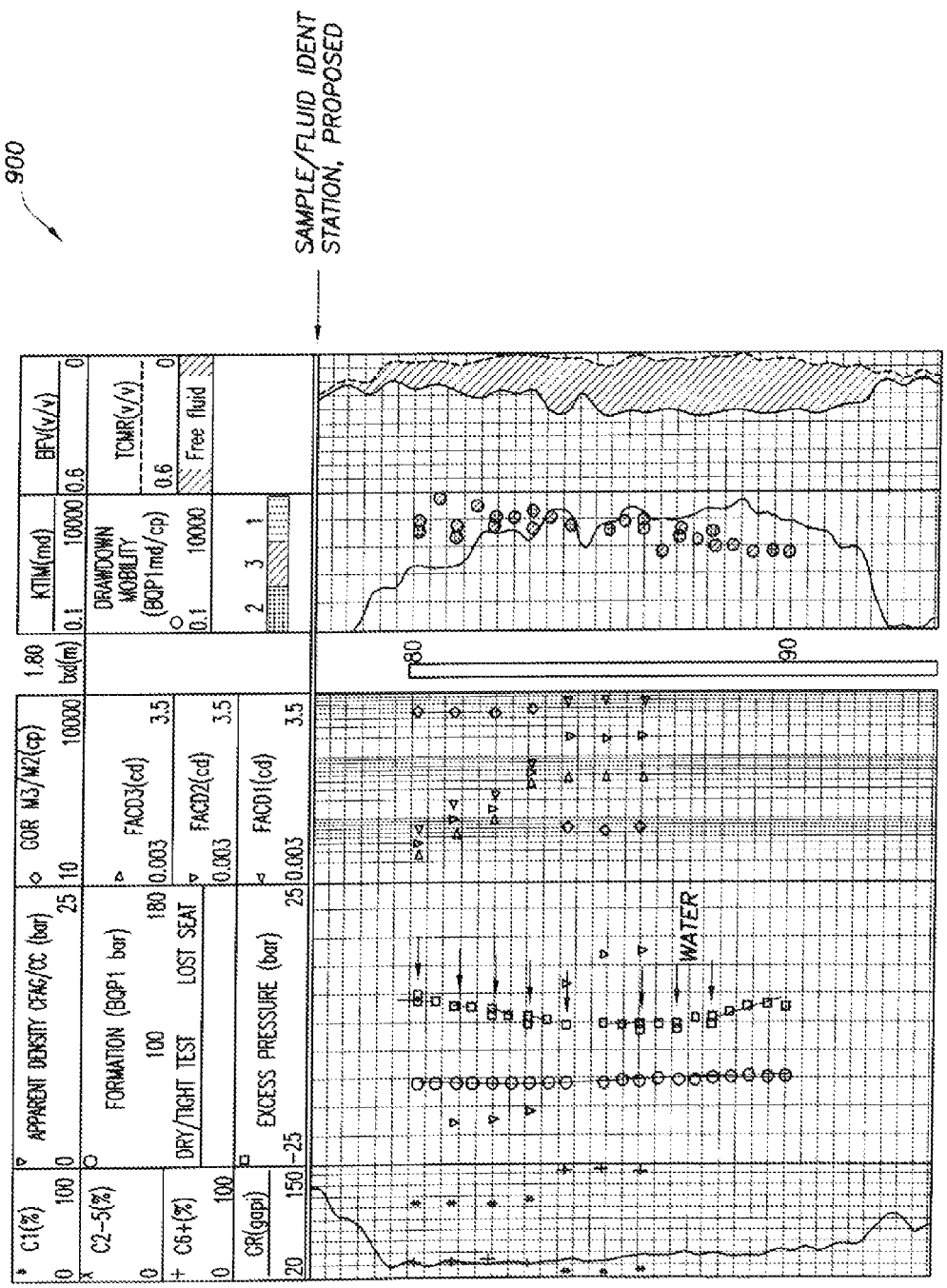
FIG. 9 depicts the well log with data collected at the additional sampling points for depths xx75 to xx95 in accordance with one or more embodiments of the invention.

FIG. 9 depicts a well log (900) with the data collected at the additional sampling points for depths xx75 to xx95. The same type of analysis is performed on this well log to analyze excess pressure anomalies and gradients, density trends and mobility trends. If needed, additional sampling points are identified and data is obtained and integrated into the well log. After no additional compositional changes are identified, the compartment composition analysis is completed. In FIG. 9, the well log shows that the openhole NMR measurements, excess pressures, colorations, gas-to-oil ratios, and apparent densities correlate well and indicate an accurate characterization of the pressure compartments and fluid gradients within the compartments, completing the compartment composition analysis. This analysis may be used to assist in developing a drilling plan for this reservoir. For example, in this graded reservoir, too much drawdown would cause gas liberation. Gas liberation is important because it changes the productivity of the reservoir; gas in the produced oil must be removed before transporting the oil. The complete compartment composition analysis provides accurate in situ fluid characterization to avoid excessive drawdown and avoid this problem.

Figure 6:
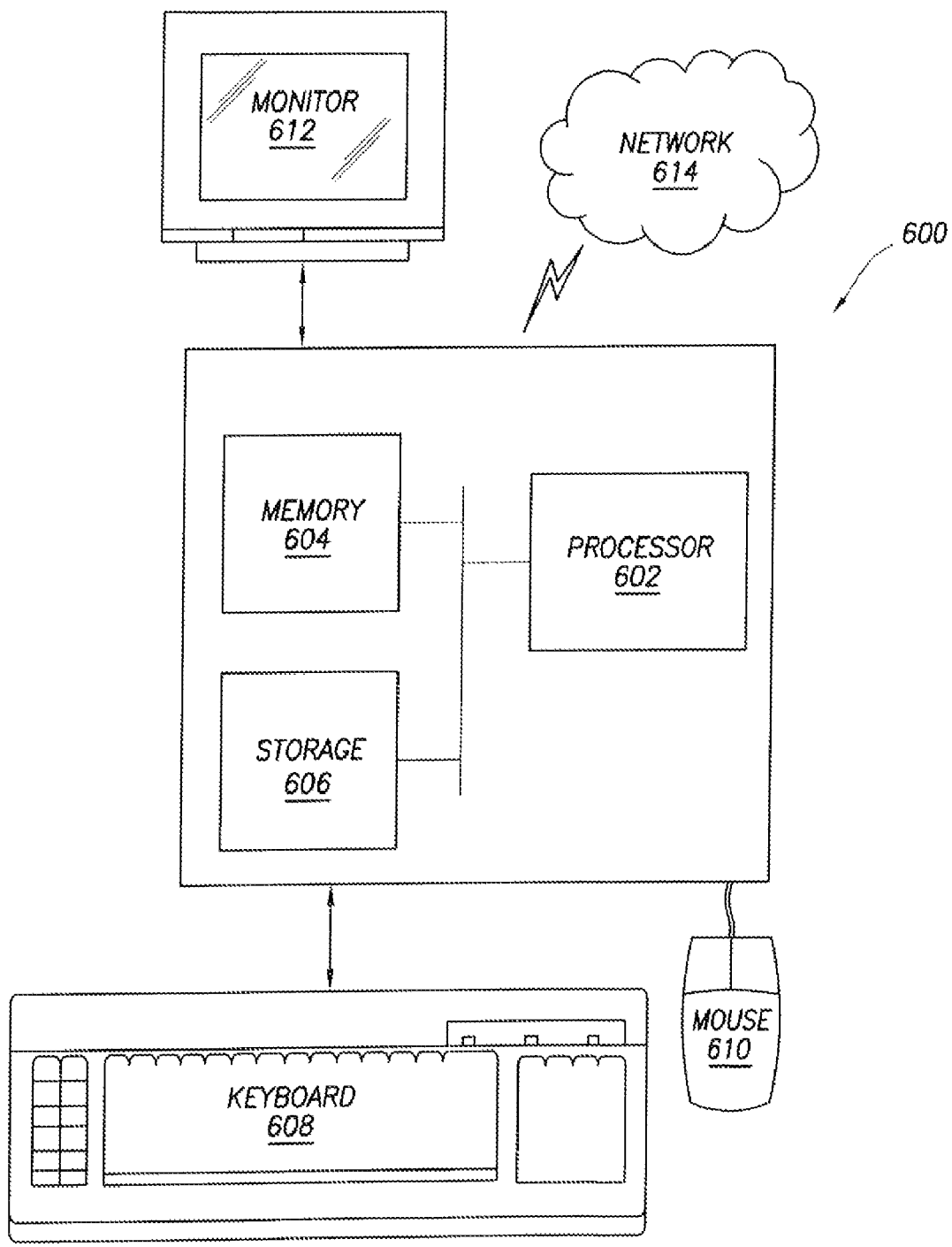
FIG. 6 depicts a computer system in accordance with one or more embodiments of the invention.

The invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608) and a mouse (610) or a microphone (not shown), and output means, such as a monitor (612) (e.g., a liquid crystal display (LCD), a plasma display, or cathode ray tube (CRT) monitor). The computer system (600) may be connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., community system, data source, data provider, software application provider, trust structure, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Further, those skilled in the art will appreciate that one or more embodiments of the invention may be implemented using a downhole tool configured to obtain the necessary measurements to perform the method described in FIG. 5 as well as the processing capability to perform the method described in FIG. 5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing fluids in a formation, comprising:
    obtaining open hole measurements for a borehole in the formation, wherein the open hole measurements for the borehole comprise nuclear magnetic resonance (NMR) measurements and modular sonic imaging platform (MSIP) measurements for the borehole;
    identifying points in the borehole from which to obtain pressure measurements using the open hole measurements;
    obtaining pressure measurements at the identified points in the borehole;
    applying an excess pressure technique to the pressure measurements to identify a plurality of pressure compartments in the borehole;
    characterizing fluid in each of the plurality of compartments; and
    developing a drilling plan based on characterization of fluids in each of the plurality of compartments.

2. The method of claim 1, wherein the characterizing fluid in each of the plurality of pressure compartments comprises performing an in situ fluid characterization of fluid for at least one location in each of the plurality pressure compartments.

3. The method of claim 1, wherein the characterizing fluid in each of the plurality of pressure compartments comprises obtaining a fluid sample for at least one location in each of the plurality pressure compartments.

4. The method of claim 1, wherein the MSIP measurements are used to identified damaged locations within the borehole and wherein fluid characterization is not performed at the damaged locations.

5. A downhole tool, comprising:
    means for obtaining open hole measurements for a borehole in a formation, wherein the open hole measurements for the borehole comprise nuclear magnetic resonance (NMR) measurements and modular sonic imaging platform (MSIP) measurements for the borehole;
    means for identifying points in the borehole from which to obtain pressure measurements using the open hole measurements;
    means for obtaining pressure measurements at the identified points in the borehole;
    means for applying an excess pressure technique to the pressure measurements to identify a plurality of pressure compartments in the borehole;
    means for characterizing fluid in each of the plurality of compartments; and
    means for developing a drilling plan based on characterization of fluids in each of the plurality of compartments.

6. The downhole tool of claim 5, wherein the means for characterizing fluid in each of the plurality of pressure compartments comprises performing an in situ fluid characterization of fluid for at least one location in each of the plurality pressure compartments.

7. The downhole tool of claim 5, wherein the means for characterizing fluid in each of the plurality of pressure compartments comprises obtaining a fluid sample for at least one location in each of the plurality pressure compartments.

8. The downhole tool of claim 5, wherein the MSIP measurements are used to identified damaged locations within the borehole and wherein fluid characterization is not performed at the damaged locations.

9. A non-transitory computer readable medium comprising instructions executable by a processor to perform a method, the method comprising:
    obtaining open hole measurements for a borehole in the formation, wherein the open hole measurements for the borehole comprise nuclear magnetic resonance (NMR) measurements and modular sonic imaging platform (MSIP) measurements for the borehole;
    identifying points in the borehole from which to obtain pressure measurements using the open hole measurements;
    obtaining pressure measurements at the identified points in the borehole;
    applying an excess pressure technique to the pressure measurements to identify a plurality of pressure compartments in the borehole;
    characterizing fluid in each of the plurality of compartments; and
    developing a drilling plan based on characterization of fluids in each of the plurality of compartments.

10. The method of claim 9, wherein the means for characterizing fluid in each of the plurality of pressure compartments comprises performing an in situ fluid characterization of fluid for at least one location in each of the plurality pressure compartments.

11. The method of claim 9, wherein the means for characterizing fluid in each of the plurality of pressure compartments comprises obtaining a fluid sample for at least one location in each of the plurality pressure compartments.

12. The method of claim 9, wherein the MSIP measurements are used to identified damaged locations within the borehole and wherein fluid characterization is not performed at the damaged locations.

* * * * *